United States Patent
Sasamura

(10) Patent No.: US 12,504,935 B2
(45) Date of Patent: Dec. 23, 2025

(54) PRINTING APPARATUS HAVING SHEET POSITION CONTROL, CONTROL METHOD, AND COMPUTER-READABLE STORAGE MEDIUM

(71) Applicant: CANON KABUSHIKI KAISHA, Tokyo (JP)

(72) Inventor: Shunichi Sasamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 87 days.

(21) Appl. No.: 18/534,846

(22) Filed: Dec. 11, 2023

(65) Prior Publication Data
US 2024/0211187 A1    Jun. 27, 2024

(30) Foreign Application Priority Data
Dec. 23, 2022 (JP) .................... 2022-207243

(51) Int. Cl.
G06F 3/12     (2006.01)
H04N 1/00     (2006.01)
H04N 1/32     (2006.01)

(52) U.S. Cl.
CPC ....... *G06F 3/1237* (2013.01); *H04N 1/00519* (2013.01); *H04N 1/00543* (2013.01); *H04N 1/00567* (2013.01); *H04N 1/00676* (2013.01); *G06F 3/121* (2013.01); *G06F 3/1211* (2013.01); *G06F 3/1217* (2013.01); *G06F 3/1218* (2013.01); *H04N 1/00082* (2013.01); *H04N 1/00084* (2013.01); *H04N 1/00551* (2013.01); *H04N 1/32646* (2013.01)

(58) Field of Classification Search
None
See application file for complete search history.

(56) References Cited

U.S. PATENT DOCUMENTS

| | | | |
|---|---|---|---|
| 2001/0001130 A1* | 5/2001 | Miyasaka | G06F 3/121 358/1.14 |
| 2017/0043596 A1* | 2/2017 | Motoyama | B26D 3/14 |
| 2021/0276348 A1* | 9/2021 | Suto | B41J 11/42 |
| 2021/0276350 A1* | 9/2021 | Murata | B65H 29/68 |

FOREIGN PATENT DOCUMENTS

JP   2013-123822 A   6/2013

* cited by examiner

*Primary Examiner* — Miya J Cato
(74) *Attorney, Agent, or Firm* — VENABLE LLP

(57) ABSTRACT

A printing apparatus includes a conveying roller to convey a sheet from a roll sheet and a printing unit. In addition, a cutter is provided downstream of the printing unit and cuts the sheet, an operation input unit accepts a setting indicating whether to cut the sheet in case of canceling a print job, and a control unit interrupts the printing operation if an open state of a cover is detected during the printing operation and controls the conveying roller to return the sheet to a predetermined position if a closed state of the cover is detected afterward. If a setting indicates that the sheet is not cut, the conveying roller returns the sheet to the predetermined position without cutting the sheet with the cutter in a case of canceling a print job.

11 Claims, 9 Drawing Sheets

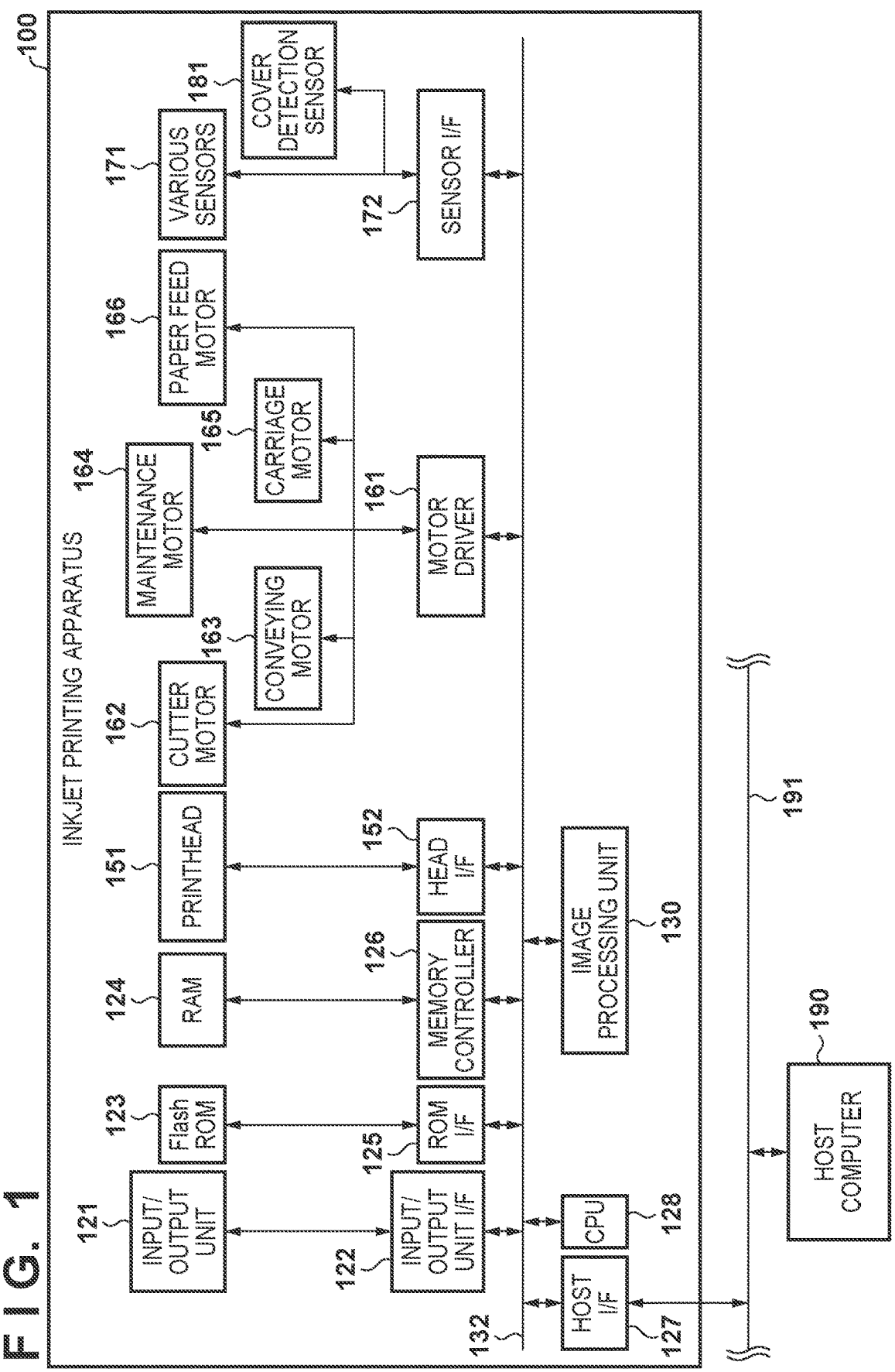

FIG. 6B

PRINTING HAS BEEN CANCELED.
PLEASE TAP [CUT SHEET] TO CUT THE SHEET,
OR TAP [RETREAT SHEET]
TO RETREAT THE SHEET TO
A PRE-SUPPLY POSITION WITHOUT CUTTING.

CUT SHEET

RETREAT SHEET

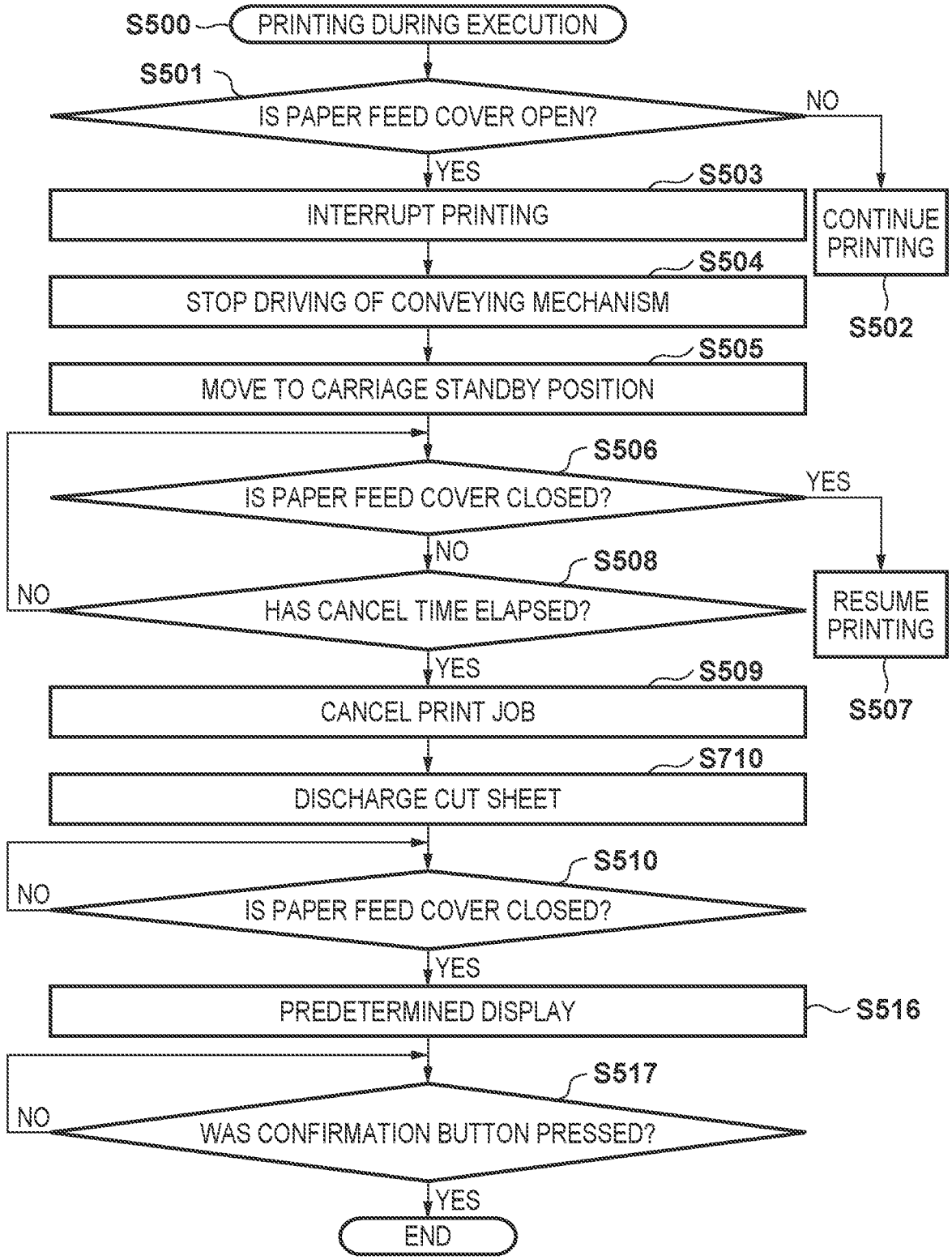

PRINTING APPARATUS HAVING SHEET POSITION CONTROL, CONTROL METHOD, AND COMPUTER-READABLE STORAGE MEDIUM

BACKGROUND OF THE INVENTION

Field of the Invention

The present invention mainly relates to a printing apparatus.

Description of the Related Art

Some printing apparatuses represented by inkjet printers and the like are configured to perform control for preventing a paper jam that can occur in a case in which a predetermined cover is opened during the execution of a printing operation to interrupt the printing operation, and then the printing operation is resumed after the cover is closed (Japanese Patent Laid-Open No. 2013-123822).

If, for example, the cover is opened over a predetermined time period for a reason such as maintenance, the print job corresponding to the interrupted printing operation can be canceled. In such a case, the occurrence of a paper jam may be unnecessarily determined due to a print medium remaining in the apparatus. This can cause a deterioration in the usability of the apparatus.

SUMMARY OF THE INVENTION

The present invention has been made after the recognition of the above problem by the present inventor and provides a technique advantageous in further improving the usability of the printing apparatus.

One aspect of the present invention provides a printing apparatus, comprising a printing unit configured to perform printing on a sheet, a conveying mechanism configured to convey the sheet, a cover portion configured to open and close with respect to an apparatus body, a first detection sensor configured to detect an open state in which the cover portion is opened and a closed state in which the cover portion is closed, a second detection sensor configured to detect the sheet on a conveyance path for the sheet by the conveying mechanism, and a control unit configured to control a printing operation including printing on the sheet by the printing unit and conveying the sheet by the conveying mechanism, wherein the control unit interrupts the printing operation if the first detection sensor detects the open state during the printing operation and controls the conveying mechanism, based on the second detection sensor, to return the sheet to a predetermined position if the first detection sensor detects the closed state afterward.

Further features of the present invention will become apparent from the following description of exemplary embodiments (with reference to the attached drawings).

BRIEF DESCRIPTION OF THE DRAWINGS

FIG. 1 is a block diagram showing an example of the system arrangement of a printing apparatus according to an embodiment;

FIG. 6B is a flowchart showing processing contents if the cover portion is opened during the execution of printing;

FIG. 7 is a flowchart showing processing contents if the cover portion is opened during the execution of printing;

DESCRIPTION OF THE EMBODIMENTS

Figure 2A:
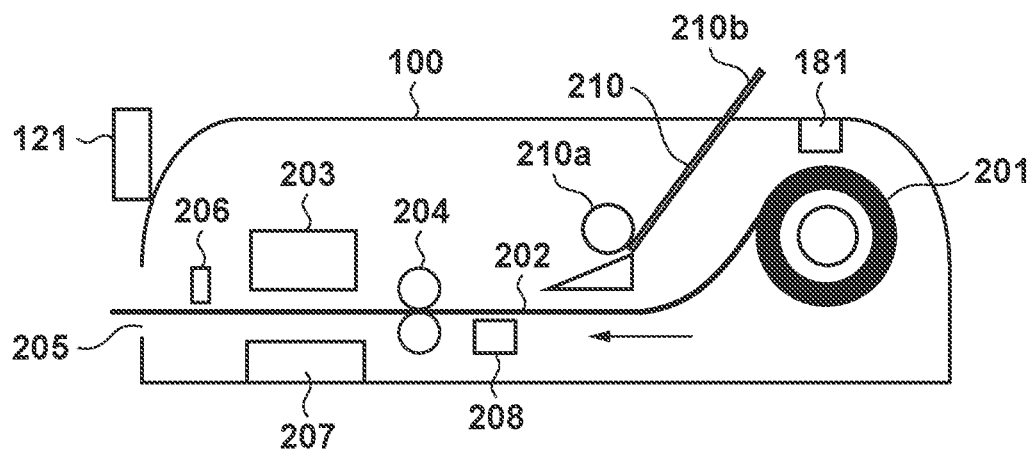
FIG. 2A is a schematic view for explaining an operation in the printing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Apparatus Arrangement)

FIG. 1 is a block diagram showing an example of the system arrangement of an inkjet printing apparatus 100 according to an embodiment. The printing function of the inkjet printing apparatus 100 can be implemented by an inkjet scheme of discharging ink (ink droplets) onto a paper material but may be implemented by other known schemes (the inkjet printing apparatus 100 will be simply referred to as the printing apparatus 100 hereinafter). The printing apparatus 100 may additionally include other functions. For example, the printing apparatus 100 may be an MFP (Multi-Function Peripheral) that includes not only a printing function but also a scan function, a copy function, and the like.

The printing apparatus 100 is interconnected to a host computer 190 via a network 191. The printing apparatus 100 includes an input/output unit I/F (interface) 122, a ROM I/F 125, a memory controller 126, a host I/F 127, a CPU (Central Processing Unit) 128, and an image processing unit 130. These components can be interconnected to each other via a system bus 132. The printing apparatus 100 further includes a Flash ROM 123 and a RAM 124. These components are connected to the system bus 132 via the ROM I/F 125 and the memory controller 126.

The CPU 128 is a control unit, typically a microprocessor or microcomputer, which controls the overall system of the printing apparatus 100 by executing programs and activating hardware. The Flash ROM 123 stores programs executed by the CPU 128 and data required to implement the respective functions of the printing apparatus 100. The RAM 124 functions as a work area of the CPU 128 and can also be used as a memory area for temporarily holding data such as reception data and setting data.

The image processing unit 130 expands or converts print data (for example, data expressed in a page description language) that can be processed by the printing apparatus 100 into image data (for example, bitmap data) and can further perform additional processing. For example, the image processing unit 130 converts the color space (for example, YCbCr) of the image data contained in print data into an RGB space (for example, sRGB). The image processing unit 130 then performs image processing for converting the resolution of the image data so as to make the data have the number of pixels corresponding to the printing apparatus 100 and performs additional image processing such as correcting the image as needed. The image obtained in this manner is stored in the RAM 124.

The printing apparatus 100 further includes a printhead 151, a cutter motor 162, a conveying motor 163, a maintenance motor 164, a carriage motor 165, a paper feed motor 166, various sensors 171, and a cover detection sensor 181. The printhead 151 is connected to the system bus 132 via a head I/F 152. The cutter motor 162, the conveying motor 163, the maintenance motor 164, and the carriage motor 165 are connected to the system bus 132 via a motor driver 161. The various sensors 171 and the cover detection sensor 181 are connected to the system bus 132 via a sensor I/F 172.

The CPU 128 controls the printhead 151 via the head I/F 152 to perform printing on a print medium (a sheet-like print medium that can be simply expressed as a "sheet" hereinafter) based on image data. In this case, "printing" means forming images such as characters, symbols, graphic patterns, and photos. The printhead 151 discharges ink in synchronism with the conveyance of a sheet and the operation of a carriage 203 (see FIGS. 2A to 2C) (to be described later) for scanning the printhead 151, thereby performing printing according to the inkjet scheme.

The CPU 128 controls the cutter motor 162 via the motor driver 161 to drive a cutter unit 206 (to be described later) for cutting a roll sheet, which is obtained by taking up a long sheet into a cylindrical shape to obtain a cut sheet having a predetermined length.

The CPU 128 controls the conveying motor 163 via the motor driver 161 to drive a conveyance roller 204 (to be described later) for conveying a roll sheet. In a maintenance operation for the printhead 151, the conveying motor 163 is driven to switch the operation of a maintenance unit 207 (to be described later).

The CPU 128 controls the maintenance motor 164 via the motor driver 161 to drive the maintenance motor 164 when performing a maintenance operation for the printhead 151.

The CPU 128 controls the carriage motor 165 via the motor driver 161 to drive the carriage for scanning the printhead 151.

The CPU 128 controls the paper feed motor 166 via the motor driver 161 to rotate a roll sheet tube 201 (to be described later) and convey the roll sheet in cooperation with the conveying motor 163. The paper feed motor 166 can also take up the roll sheet on the conveyance roller 204 by reversely rotating the roll sheet tube 201 (returning the roll sheet to the position on the upstream side in the conveying direction).

The various sensors 171 detect information required for printing, such as the conveyed state of the roll sheet and the position of the carriage of the printhead 151. The CPU 128 obtains the detection results obtained by the various sensors 171 as sensor signals via the sensor I/F 172.

Assume that the cover detection sensor 181 is provided as one of limit switches. The cover detection sensor 181 as a limit switch is pressed down if a cover portion 430 (to be described later) is closed (in a closed state) and is opened if the cover portion 430 is opened (in an open state). In this manner, the cover detection sensor 181 can detect the open/closed state of the cover portion 430 but is not limited to the configuration in this example.

The printing apparatus 100 further includes an input/output unit 121. The CPU 128 controls the input/output unit 121 via the input/output unit I/F 122. The input/output unit 121 is typically formed by integrating an operation input unit with a display unit and includes, for example, hard keys and/or a panel which accepts inputs such as print settings from the user and a display for displaying or notifying the user of print information. In this case, the printing settings include a setting for making manual cutting (to be described later) valid/invalid. The input/output unit 121 may further include a sound source and may perform displaying or notification with respect to the user with a predetermined sound.

Note that the input/output unit 121 is incorporated in the printing apparatus 100 in this embodiment but may be provided outside the printing apparatus 100 and connected as an external device to the printing apparatus 100 via, for example, the network 191. Alternatively, the host computer 190 may also function as the input/output unit 121. In addition to the input/output unit 121, another input/output unit may be connected to the printing apparatus 100 via the network 191.

The host computer 190 is an external device serving as a source for supplying print data. Typically, a printer driver is installed in the host computer 190. The printing apparatus 100 may be provided with a data providing device serving as a source for supplying print data in place of the host computer 190, for example, an image reader, a digital camera, or a smartphone. The host I/F 127 receives print data by stream communication with the host computer 190 and saves the print data supplied from the host computer 190 in the RAM 124 via the memory controller 126. Note that communication between the printing apparatus 100 and the host computer 190 (or another communication device) may not be limited to that implemented via the network 191 and may be implemented by another known means.

Figure 2B:
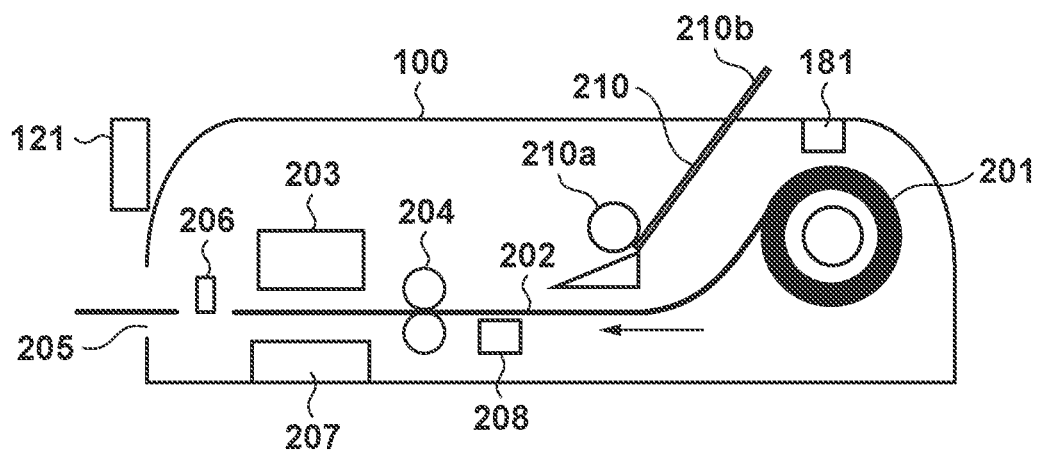
FIG. 2B is a schematic view for explaining an operation in the printing apparatus.
Figure 2C:
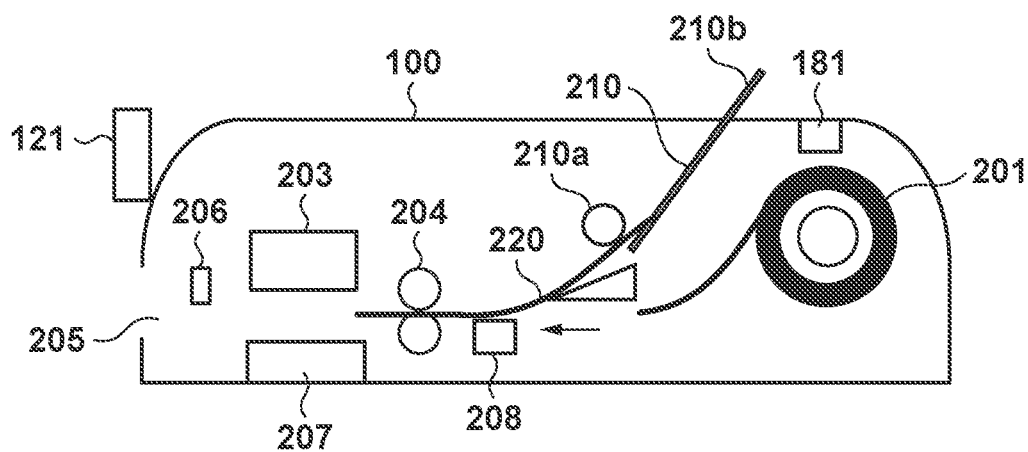
FIG. 2C is a schematic view for explaining an operation in the printing apparatus.

FIGS. 2A to 2C are schematic views for explaining operations in the printing apparatus 100. FIG. 2A shows how a paper feed operation is performed to supply a roll sheet. FIG. 2B shows how a paper discharging operation is performed to discharge the roll sheet. FIG. 2C shows how a paper feed operation for a cut sheet is performed. The printing apparatus 100 is provided with a conveyance path for a roll sheet and a conveyance path for a cut sheet and hence can supply and discharge both a roll sheet and a cut sheet.

A conveyance path for both a roll sheet and a cut sheet is provided with a sheet detection sensor 208 that can detect a sheet. This makes it possible to determine whether the conveyance path is in a paper feeding state (whether a roll sheet or a cut sheet is present). If, for example, the sheet detection sensor 208 detects that the printing apparatus 100 is in a paper feeding state upon reception of a print job, the CPU 128 determines that a paper jam has occurred and can notify the user of the occurrence.

As shown in FIG. 2A, the printing apparatus 100 includes, as roll sheet conveying means, the roll sheet tube 201 that can be driven by the paper feed motor 166 and the conveyance roller 204 that can be driven by the conveying motor 163. Rotating the roll sheet tube 201 and the conveyance roller 204 will convey a roll sheet 202 from the roll sheet tube 201 along the conveyance path and supply the roll sheet 202 to a position facing the carriage 203 on which the printhead 151 is mounted. The printhead 151 discharges ink onto the roll sheet 202 conveyed in this manner, thus performing printing.

Subsequently, the cutter motor 162 drives the cutter unit 206 to cut the printed roll sheet, as shown in FIG. 2B. The cut sheet is discharged from a paper discharge port 205.

As shown in FIG. 2C, the printing apparatus 100 includes, as cut sheet conveying means, the conveyance roller 204 and a feed unit 210 that supplies a cut sheet 220 placed on a tray 210b with a feed roller 210a. In a cut sheet supplying operation, the cut sheet 220 placed on the tray 210b is supplied from the tray 210b toward the carriage 203 by the feed roller 210a and conveyed along the conveyance path by the rotation of the conveyance roller 204.

As shown in FIGS. 2A to 2C, the input/output unit 121 is provided above the paper discharge port 205, and the user can perform operation input to the input/output unit 121 and remove a printed cut sheet from the paper discharge port 205. The maintenance unit 207 is provided at a position that faces the carriage 203 on which the printhead 151 is mounted and is located outside the conveyance path of the roll sheet 202. This makes it possible to execute a maintenance operation for the printhead 151.

Figure 3:
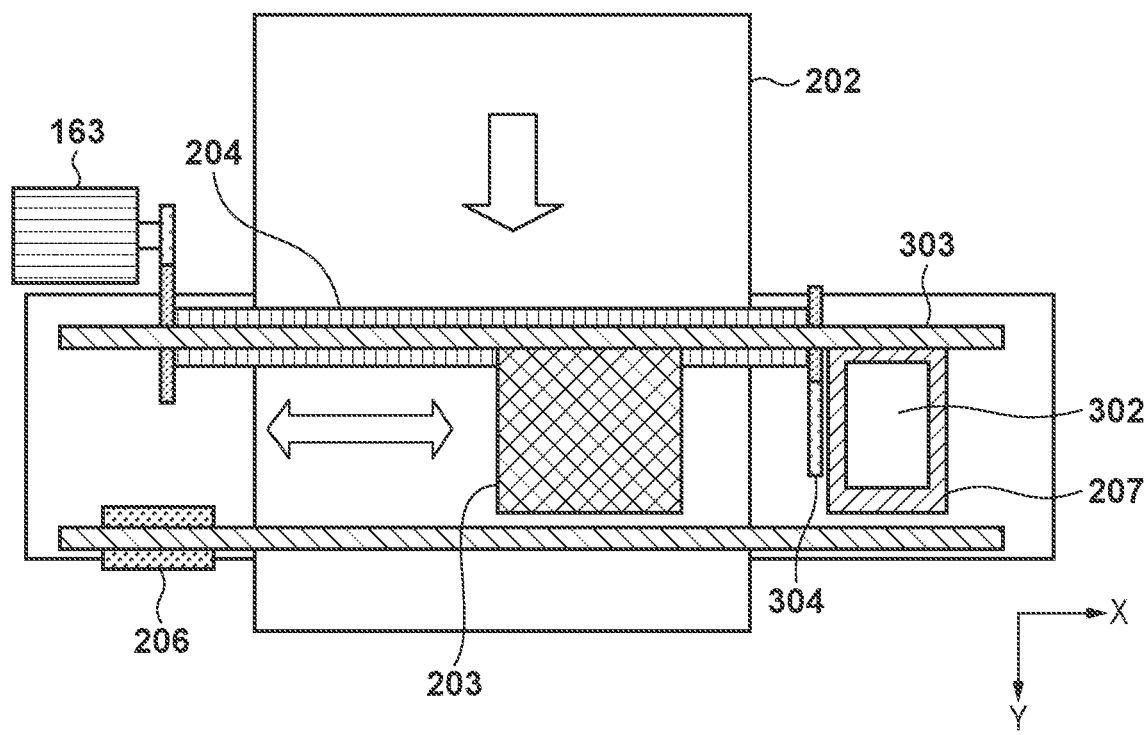
FIG. 3 is a schematic plan view viewed from the roll sheet upper surface side of the printing apparatus.

FIG. 3 is a schematic plan view viewed from the roll sheet upper surface side of the printing apparatus 100. The printhead 151 can reciprocate along a print guide 303 by moving back and forth the carriage 203, on which the printhead 151 is mounted, using the carriage motor 165. The roll sheet 202 is conveyed by rotating the conveyance roller 204 using the conveying motor 163. The printing apparatus 100 performs printing on the roll sheet 202 while moving back and forth the carriage 203 and conveying the roll sheet 202. The printed roll sheet 202 is cut by the cutter unit 206 located downstream of the conveyance path for the roll sheet 202.

A maintenance operation for the printhead 151 is performed by moving the carriage 203 to a position facing the maintenance unit 207 and operating the maintenance unit 207. When the conveying motor 163 is driven, a gear 304 in contact with the maintenance unit 207 through the conveyance roller 204 rotates, that is, the operation of the maintenance unit 207 can be switched through the gear 304 upon driving of the conveying motor 163. Note that the maintenance unit 207 is provided with a cap 302.

Figure 4:
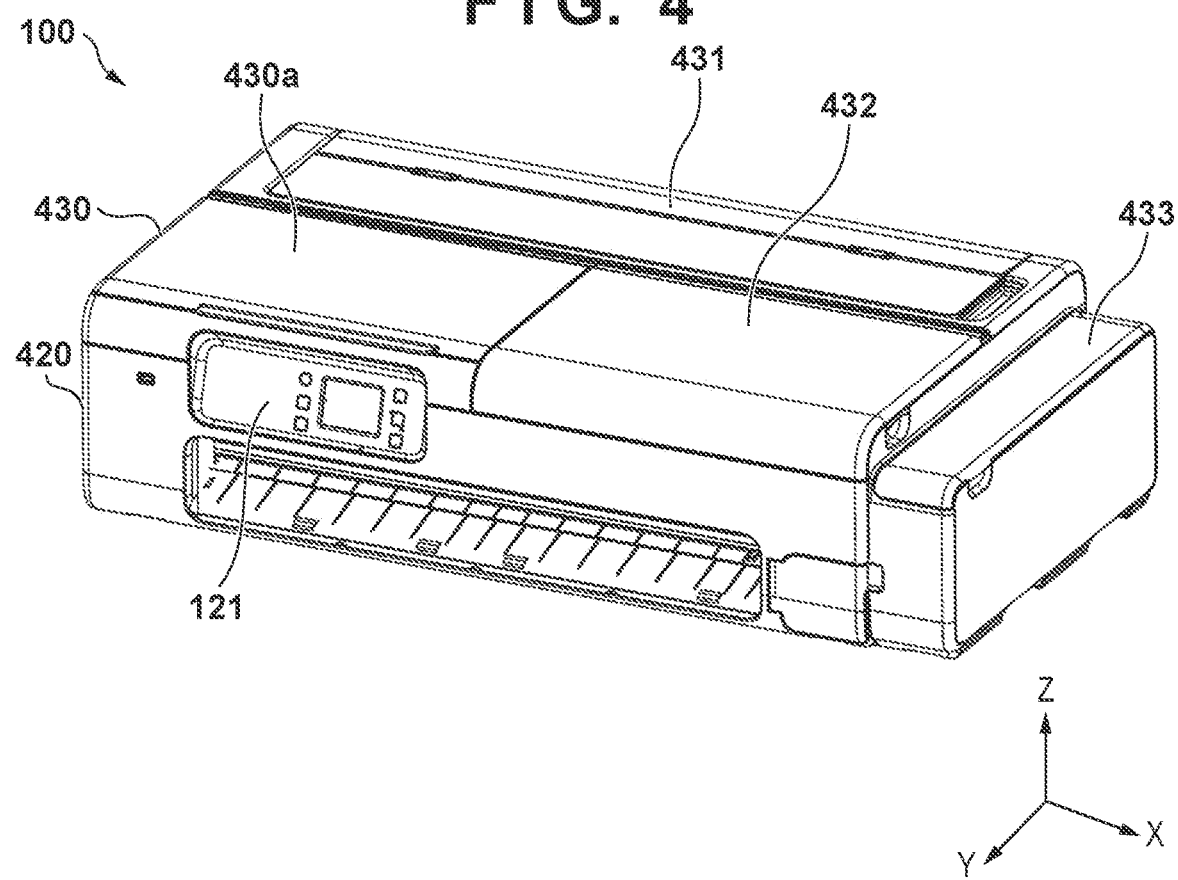
FIG. 4 is a front side perspective view showing an outer appearance of the printing apparatus.

FIG. 4 is a front side perspective view showing an outer appearance of the printing apparatus 100. A direction X shown in FIG. 4 corresponds to the widthwise direction of the apparatus, a direction Y corresponds to the depth direction of the apparatus, and a direction Z corresponds to the height direction of the apparatus. In addition, the directions X and Y are substantially orthogonal to each other and form a horizontal plane.

In this embodiment, an apparatus main body 420 of the printing apparatus 100 is provided with the cover portion 430 that is attached to the apparatus main body 420 so as to be able to open and close. The cover portion 430 is provided so as to cover the apparatus main body 420 and can form the top cover portion of the printing apparatus 100. The cover portion 430 includes a plurality of access covers 431, 432, and 433 for access into the apparatus. The access cover 431 is opened when a cut sheet as a print medium is set and can also be expressed as the cover 431 for paper feeding or simply the paper feed cover 431. The access cover 432 is opened for access into the apparatus when a maintenance operation is performed and can also be expressed as the cover 432 for maintenance or simply the maintenance cover 432. The access cover 433 is opened for access to the tank in the apparatus for the replacement of the tank, the replenishment of ink to the tank, or the like and can also be expressed as the cover 433 for tank access or simply the tank access cover 433.

The apparatus main body 420 is provided with a read unit (scanner unit) 430a for reading an original image. The read unit 430a is installed so as to open and close together with the access cover 432. The user can perform a maintenance operation upon opening the access cover 432 together with the read unit 430a.

The front portion of the printing apparatus 100 is provided with an operation input unit as the input/output unit 121 that can accept operation inputs from the user. As described above, this operation input unit is provided together with the display unit so as to serve as, for example, a touch panel display. This makes it possible to accept an operation input from the user and display predetermined information to the user.

Figure 8A:
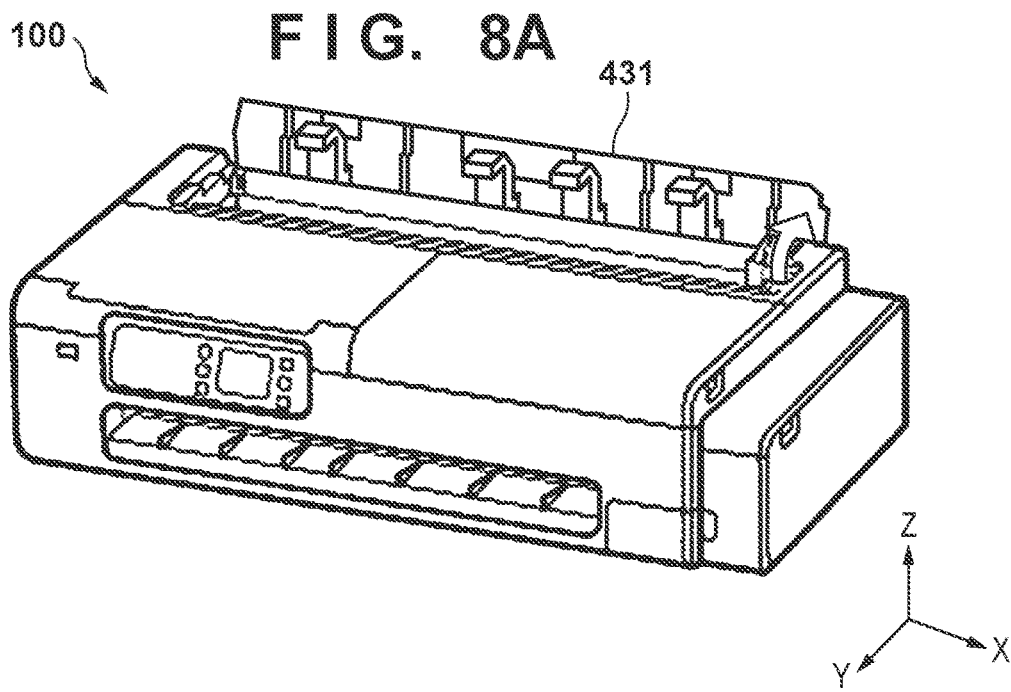
FIG. 8A is a perspective view of the printing apparatus.
Figure 8B:
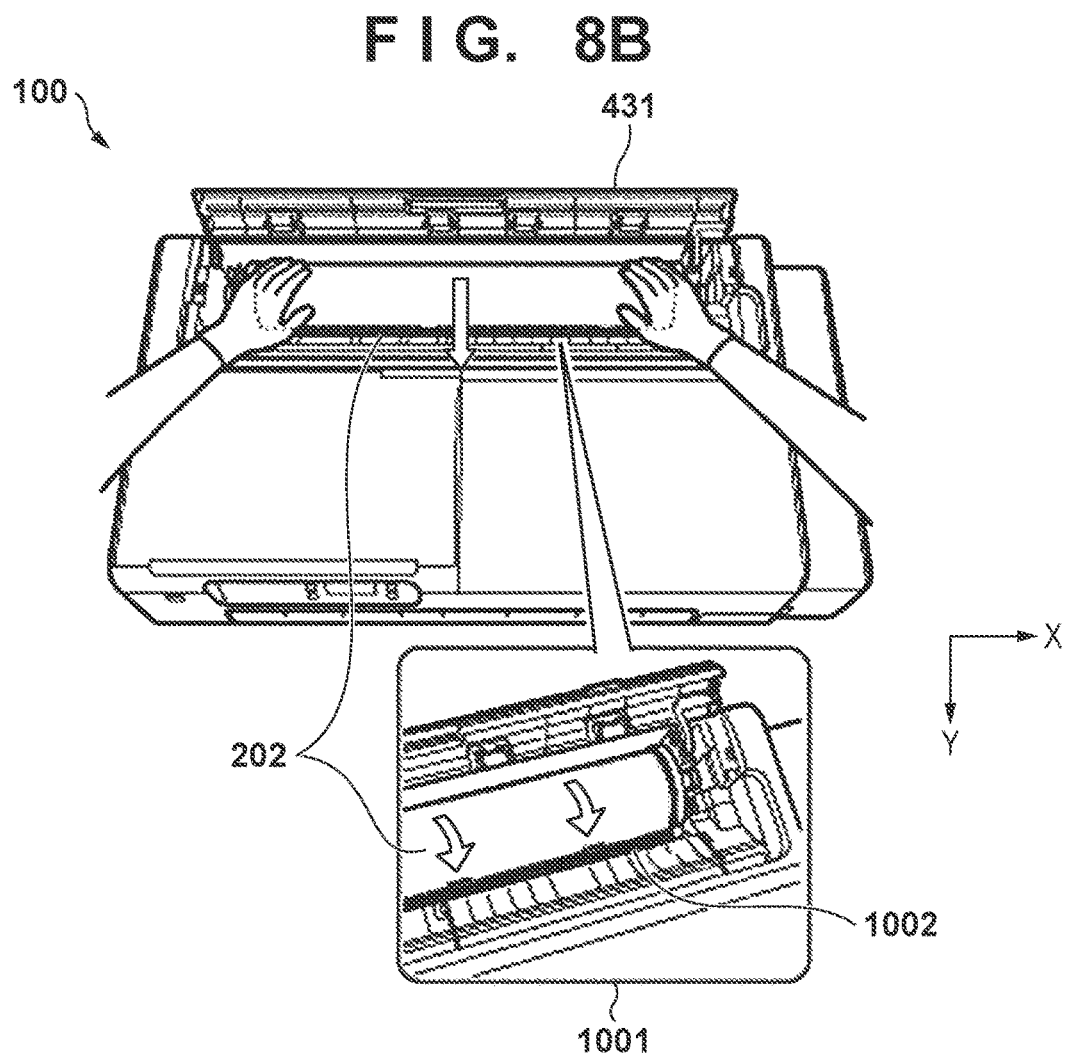
FIG. 8B is a perspective view of the printing apparatus.

FIG. 8A shows how the access cover 431 is set in an open state in the printing apparatus 100 in FIG. 4. FIG. 8B is a perspective view of the printing apparatus 100 when viewed from the front above, showing how the user attaches the roll sheet 202 to the printing apparatus 100. Upon attaching the roll sheet 202, the user closes the access cover 431. The access cover 431 is not often provided with a lock mechanism. In such a case, the user may open or close the access cover 431 at an arbitrary timing.

Figure 9A:
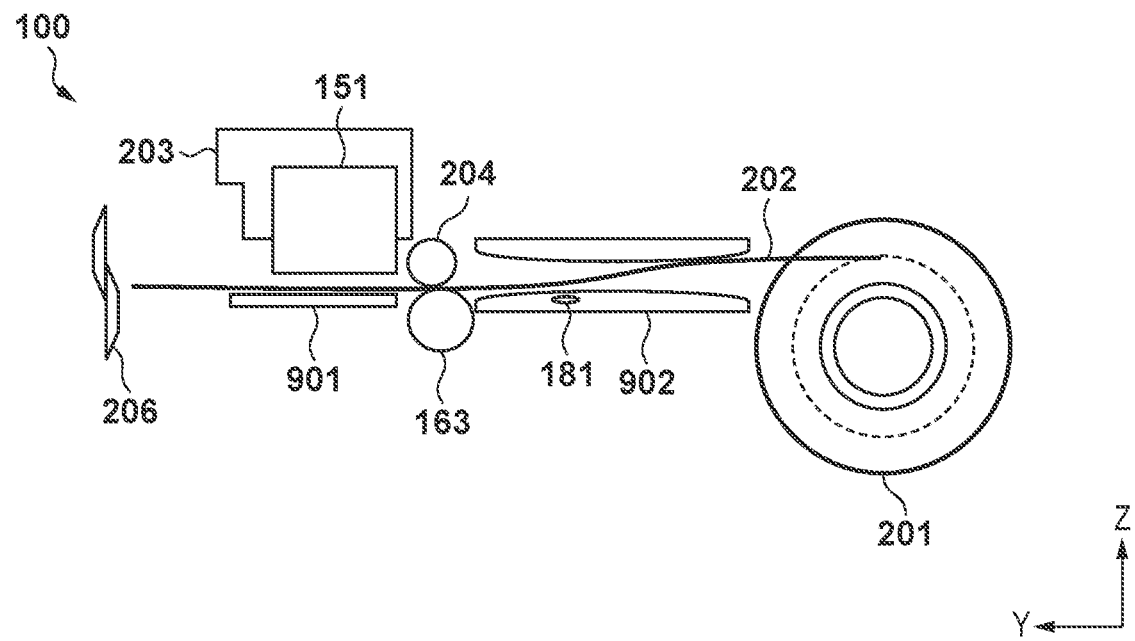
FIG. 9A is a schematic side view showing a state in the printing apparatus.
Figure 9B:
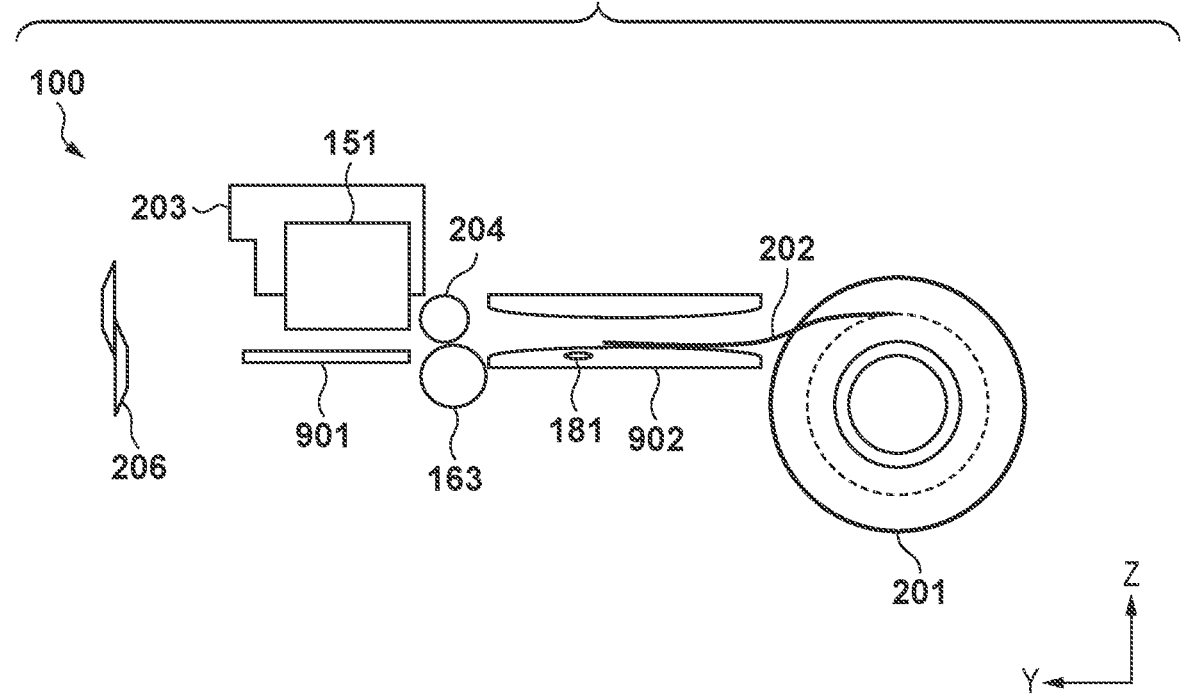
FIG. 9B is a schematic side view showing a state in the printing apparatus.

FIG. 9A is a schematic side view showing a state in the printing apparatus 100 before the roll sheet 202 is taken up and retreated upon completion of printing. FIG. 9B is a schematic side view showing a state in the printing apparatus 100 after the roll sheet 202 is cut by the cutter unit 206 upon completion of printing, and the remaining roll sheet 202 is taken up and retreated.

After the roll sheet 202 is cut by the cutter unit 206, the roll sheet remains on a platen 901 across a conveyance guide 902 and hence is detected by the sheet detection sensor 208 (see FIGS. 2A to 2C).

The remaining roll sheet 202 can be taken up by the roll sheet tube 201 as shown in FIG. 9B by reversely rotating the roll sheet tube 201 using the paper feed motor 166. At this time, in response to the sheet detection sensor 208 detecting the run out of the roll sheet 202, the driving of the conveying motor 163 and the paper feed motor 166 is stopped, thereby completing taking up the roll sheet 202.

Example 1

Figure 5:
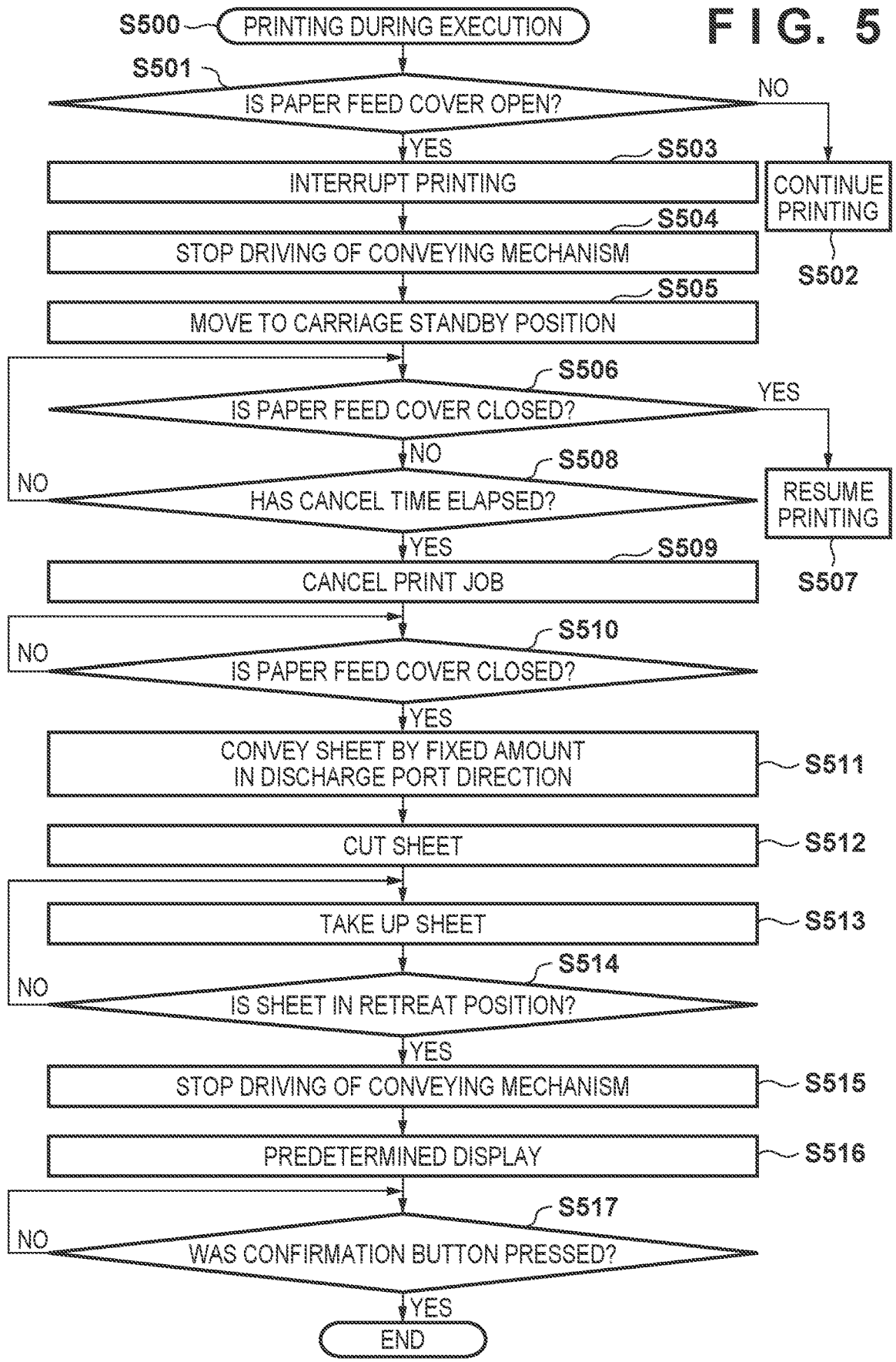
FIG. 5 is a flowchart showing processing contents if a cover portion is opened during the execution of printing.

FIG. 5 is a flowchart showing an example of processing contents in a case in which, for example, the user opens a paper feed cover 431 while executing printing on a roll sheet. This flowchart is mainly executed by a CPU 128 and is started in response to the start of execution of printing by a printing apparatus 100 based on a print job (S500).

In step S501, the CPU 128 determines whether the paper feed cover 431 is opened during execution of printing. If the paper feed cover 431 is opened, the process advances to step S503; otherwise, the process advances to step S502 to continue the printing.

In step S503 (if the paper feed cover 431 is opened), the CPU 128 interrupts the printing. The CPU 128 stops the driving of the conveying mechanism in response to the interruption of printing. In this case, the CPU 128 stops the driving of a carriage motor 165, a conveying motor 163, and a paper feed motor 166 (S504). Thereafter, in step S505, the CPU 128 moves a carriage 203 to a standby position (for example, the position of a cap 302) and stops the carriage 203.

Steps S503 to S505 can be regarded as an operation to interrupt the printing operation. In addition to this operation, the elapsed time from the interruption of the printing operation is measured as the time for determining the necessity of the cancellation of the print job. In this case, "cancellation" indicates that printing based on a print job is finished incompletely. Assume that the time for canceling a print job is set in advance (for example, 5 min) in the printing apparatus 100 and stored in a RAM 124.

In step S506, the CPU 128 determines whether the paper feed cover 431 is closed. In step S508, the CPU 128 determines whether the elapsed time has reached the cancellation time. If the paper feed cover 431 is closed before the elapsed time reaches the cancellation time, the process advances to step S507 to resume printing. If the elapsed time has reached the cancellation time without closing the paper feed cover 431, the process advances to step S509, in which the print job is canceled. That is, if the paper feed cover 431 opened during execution of printing is not closed over a predetermined time period, the print job is canceled.

In step S510, the CPU 128 determines whether the paper feed cover 431 is closed. The process advances to step S511 in response to the paper feed cover 431 being closed. In this case, if the paper feed cover 431 is not closed, the user can touch not only the roll sheet but also the conveying mechanism including the paper feed motor 166 (see FIG. 8B). For this reason, the driving of the conveying mechanism is preferably suppressed. Accordingly, step S510 is continued until the paper feed cover 431 is closed.

In step S511, in response to the paper feed cover 431 being closed, the conveying motor 163 and the paper feed motor 166 are driven to convey the roll sheet by a predetermined distance toward the paper discharge port 205.

In step S512, the roll sheet conveyed toward the paper discharge port 205 in step S511 is cut into a sheet having a predetermined length by a cutter unit 206.

In step S513, the roll sheet cut in step S512 is taken up by the conveying motor 163 and the paper feed motor 166.

In step S514, the CPU 128 determines whether the roll sheet taken up in step S513 has returned to a predetermined position. This operation can be implemented by using a sheet detection sensor 208. If the sheet detection sensor 208 detects the roll sheet, the process returns to step S513; otherwise (if the sheet detection sensor 208 does not detect the roll sheet), the process advances to step S515. That is, the predetermined position in this case corresponds to a position at which the detection result (the presence/absence of the roll sheet) obtained by the sheet detection sensor 208 is switched and can also be expressed as a retreat position.

In step S515, the CPU 128 stops the driving of the conveying motor 163 and the paper feed motor 166 assuming that the roll sheet has been taken up and retreated to the retreat position. Assume that the roll sheet has been completely taken up in this manner.

In step S516, the CPU 128 displays, on the display unit of an input/output unit 121, information indicating the cancellation of a print job, such as information indicating that the paper feed cover 431 is opened during execution of printing and information indicating the interruption of printing. This information can be displayed together with a confirmation button to prompt the user to confirm the cancellation of the print job.

In step S517, the CPU 128 determines whether the confirmation button displayed in step S516 is pressed. If the confirmation button is pressed, the flowchart is terminated; otherwise, the process returns to step S517 (the display operation in step S516 is continued). This allows the user to confirm that the print job is canceled. For example, upon confirming that the paper feed cover 431 is closed, the user can generate a print job again as needed.

According to this embodiment, if the paper feed cover 431 is kept open over a predetermined time period during the printing operation of the printing apparatus 100, the print job is canceled. When the paper feed cover 431 is closed again, the roll sheet is taken up and retreated to the retreat position. Such control makes it possible to properly prevent a situation in which the occurrence of a paper jam is determined when, for example, the user accesses the inside of the apparatus at an unexpected timing to result in the roll sheet being present at, for example, a position at which a printhead 151 performs printing. Since the roll sheet is not taken up until the paper feed cover 431 is closed (while the paper feed cover 431 is open), this control is advantageous in improving the safety.

Although Example 1 has exemplified the case in which the paper feed cover 431 is opened during the printing operation of the printing apparatus 100, the same applies to a case in which another cover of the cover portion 430 is opened.

Although the sheet detection sensors 208 are provided in both the conveyance path for a roll sheet and the conveyance path for a cut sheet, the placement positions of the sensors are not limited to those in Example 1 as long as the retreat of the roll sheet can be detected. For example, the sheet detection sensor 208 may be additionally provided in the conveyance path for only a roll sheet (a position before the confluence between the conveyance path for a roll sheet and the conveyance path for a cut sheet/on the upstream side of the confluence). In this case, a roll sheet is not detected in both the conveyance paths for a roll sheet and a cut sheet and is detected in the conveyance path for only a roll sheet. This makes it possible to detect the retreat of the roll sheet with high accuracy.

Example 2

Figure 6A:
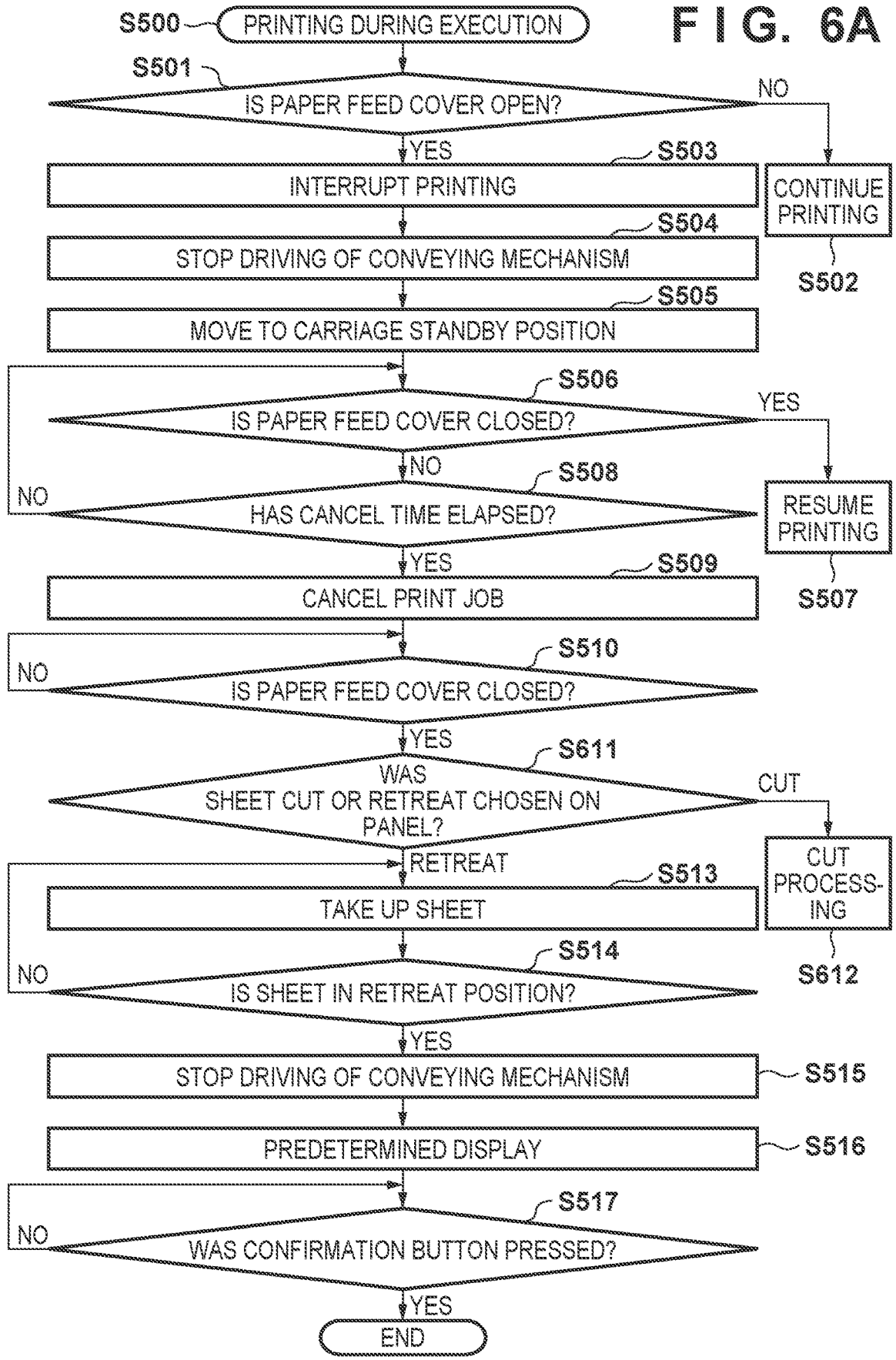
FIG. 6A is a flowchart showing processing contents if the cover portion is opened during the execution of printing.

FIG. 6A is a flowchart showing an example of processing contents including a mode of not cutting part of a roll sheet with a cutter unit 206 in a case in which the roll sheet is retreated by being taken up. The same step numbers as in Example 1 denote steps in this flowchart which exhibit the same processing contents as in Example 1 described above, and a description of them will be omitted.

In step S611 (if the elapsed time since the interruption of the printing operation after a paper feed cover 431 is opened has reached the cancellation time), the display exemplarily shown in FIG. 6B is output to the display unit of an input/output unit 121. The display contents are not limited to those in Example 2 as long as the display enables the user to input a choice between "cut sheet" and "retreat sheet".

In Example 2, if "cut sheet" is selected, part of the roll sheet is cut with the cutter unit 206, and the process advances to step S612 (the contents of step S612 are similar to those of steps S511 to S517). In contrast to this, if "retreat sheet" is selected, the roll sheet is retreated without cutting part of the printed roll sheet, and the process advances to step S513.

According to such control, if a print job is canceled, it is possible to reuse part of a printed roll sheet under user's decision in addition to being able to obtain the effects of Example 1 described above.

Example 3

FIG. 7 is a flowchart showing an example of processing contents in a case in which a paper feed cover 431 is opened during execution of printing on a cut sheet. Even in a case in which a printing target is a cut sheet, the steps up to step S509 are similar to those in Example 1 described above.

In a case in which a printing target is a cut sheet, a paper feed motor 166 for rotating a roll sheet tube 201 is not driven. Accordingly, if the paper feed cover 431 is opened to cancel the print job, the cut sheet can be discharged by driving a conveying motor 163 in step S710. That is, in a case in which a printing target is a cut sheet, it is possible to relatively easily complete processing for canceling a print job without performing a take-up operation required when a printing target is a roll sheet.

According to the above embodiment, in the printing apparatus 100 configured to selectively use a roll sheet or a cut sheet as a printing target, if the cover portion 430 such as the paper feed cover 431 is kept open over a predetermined time period during a printing operation, the print job is canceled. In a case in which a printing target is a roll sheet, when the cover portion 430 is closed again, the roll sheet is taken up and retreated to the retreat position while an unnecessary printed part of the roll sheet is cut or not cut with the cutter unit 206. Such control makes it possible to properly prevent a situation in which the occurrence of a paper jam is unnecessarily determined. This is advantageous in improving the usability of the printing apparatus 100.

Although the above embodiment has exemplified the serial head type printing apparatus 100 that scans the printhead 151 by using the carriage 203, the printing apparatus 100 may be that of the line head type configured to scan a sheet with respect to the printhead 151. In addition, this embodiment has exemplified the inkjet scheme as a printing scheme. However, the electrophotographic scheme or another known printing scheme may be used. That is, the printing unit that actually executes printing on a sheet is not limited to the combination of the printhead 151 and the carriage 203 and may be implemented by another known form.

(Program)

The present invention can be implemented by processing of supplying a program for implementing one or more functions of the above-described embodiments to a system or apparatus via a network or storage medium, and causing one or more processors in the computer of the system or apparatus to read out and execute the program. The present invention can also be implemented by a circuit (for example, an ASIC) for implementing one or more functions.

(Others)

The above description has been made by exemplifying the printing apparatus 100 having a printing function as a main function. However, the present invention may be applied to another electrical apparatus having a printing function as a sub function. Examples of such apparatus include a manufacturing apparatus for manufacturing a color filter, an electronic device, an optical device, a minute structure, and the like according to a predetermined printing scheme.

Furthermore, "print" in this specification should be interpreted in a broader sense. Hence, the mode of "print" is irrespective of whether or not the target to be formed on a print medium is significant information such as a character or graphic pattern, and is also irrespective of whether the target is manifested in a way that can be perceived visually by humans.

"Print medium" should also be interpreted in a broader sense, like "print". Hence, the concept of "print medium" can include not only paper used in general but also any materials capable of receiving ink, including fabrics, plastic films, metals, metal plates, glass, ceramics, resins, wood, and leathers.

"Ink" should also be interpreted in a broader sense, like "print". Hence, the concept of "ink" can include not only a liquid that is applied to a print medium to form an image, a design, a pattern, or the like but also an incidental liquid that can be provided to process a print medium or process ink (for example, coagulate or insolubilize color materials in ink applied to a print medium). From this viewpoint, a printing apparatus may be expressed as a liquid discharging apparatus. From a similar viewpoint, a printhead may be expressed as a liquid discharging head.

In the embodiments, individual elements are named by expressions based on their main functions. However, the functions described in the embodiments may be sub-functions, and the expressions are not strictly limited. Furthermore, the expressions can be replaced with similar expressions. In the same vein, an expression "unit (portion)" can be replaced with an expression "tool", "component", "member", "structure", "assembly", or the like. Alternatively, these may be omitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-207243, filed on Dec. 23, 2022, which is hereby incorporated by reference herein in its entirety.

What is claimed is:

1. A printing apparatus comprising:
   a conveying roller configured to convey a sheet which is pulled from a roll sheet;
   a printing unit, including a printhead, configured to perform printing on the sheet conveyed by the conveying roller;
   a cover portion configured to open and close with respect to an apparatus body;
   a first detection sensor configured to detect an open state in which the cover portion is opened and a closed state in which the cover portion is closed;
   a second detection sensor configured to detect the sheet on a conveyance path for the sheet by the conveying roller;
   a cutter provided downstream of the printing unit and configured to cut the sheet;
   an operation input unit, including a display, configured to accept a setting indicating whether to cut the sheet in a case of canceling a print job; and
   a control unit, including a CPU, configured to control a printing operation including printing on the sheet by the printing unit and conveying the sheet by the conveying roller,
   wherein the control unit interrupts the printing operation if the first detection sensor detects the open state during the printing operation and controls the conveying roller, based on the second detection sensor, to return the sheet to a predetermined position if the first detection sensor detects the closed state afterward, and
   wherein if a setting accepted by the operation input unit indicates the sheet is not cut, the control unit controls the conveying roller so as to return the sheet to the predetermined position without cutting the sheet with the cutter in a case of canceling a print job.

2. The apparatus according to claim 1, wherein the control unit performs a printing operation including printing on a sheet by the printing unit and conveying the sheet by the conveying roller based on a print job and, if the first detection sensor detects the open state over a predetermined time period during a printing operation based on a given print job, cancels the print job.

3. The apparatus according to claim 2, further comprising a paper discharge port configured to discharge a sheet cut by a cutter,
   wherein if a setting accepted by the operation input unit indicates the sheet is cut, the control unit cuts the sheet with the cutter in a case of canceling a print job and controls the conveying roller so as to return the remaining sheet to the predetermined position and discharge the cut sheet from the paper discharge port.

4. The apparatus according to claim 2, wherein after the cover portion is set in the open state during a printing operation based on a given print job, the control unit controls the printing unit and the conveying roller so as to resume the printing operation if the first detection sensor detects the closed state before an elapse of the predetermined time period.

5. The apparatus according to claim 1, wherein the conveying roller is further configured to convey a cut sheet,
   a conveyance path for a sheet by the conveying mechanism includes a conveyance path for a roll sheet, a conveyance path for a cut sheet, and a conveyance path where the conveyance paths become confluent, and
   the second detection sensor is provided in the confluence conveyance path.

6. The apparatus according to claim 5, wherein the control unit drives the conveying mechanism until the second detection sensor does not detect the sheet when returning the sheet to the predetermined position.

7. The apparatus according to claim 1, wherein the printing unit further includes a carriage configured to scan the printhead.

8. A control method for a printing apparatus including a conveying roller configured to convey a sheet which is pulled out from a roll sheet, a printing unit, including a print head, configured to perform printing on the sheet conveyed by the conveying roller, a cover portion configured to open and close with respect to an apparatus body, a first detection sensor configured to detect an open state in which the cover portion is opened and a closed state in which the cover portion is closed, a second detection sensor configured to detect the sheet on a conveyance path for the sheet by the conveying roller, a cutter provided downstream of the printing unit and configured to cut the sheet, and an operation input unit, including a display, configured to accept a setting indicating whether to cut the sheet in a case of canceling a print job,
   the method comprising:
   controlling a printing operation including printing on a sheet by the printing unit and conveying the sheet by the conveying roller;
   interrupting the printing operation if the first detection sensor detects the open state during the printing operation;
   controlling the conveying roller based on the second detection sensor so as to return the sheet to a predetermined position if the first detection sensor detects the closed state; and
   controlling the conveying roller, if a setting accepted by the operation input unit indicates the sheet is not cut, so as to return the sheet to the predetermined position without cutting the sheet with the cutter in a case of canceling a print job.

9. The method according to claim 8, wherein a printing operation including printing on a sheet by the printing unit and conveying the sheet by the conveying roller is performed based on a print job, and
   the control method further comprises, if the first detection sensor detects the open state over a predetermined time period during a printing operation based on a given print job, canceling the print job.

10. The method according to claim 9, wherein the printing apparatus further includes a paper discharge port configured to discharge a sheet cut with a cutter, and
    the control method further comprises, if a setting accepted by the operation input unit indicates the sheet is cut, cutting a roll sheet with the cutter in a case of canceling a print job and controlling the conveying roller so as to return the remaining sheet to the predetermined position and discharge the cut sheet from the paper discharge port.

11. The method according to claim 9, further comprising, after the cover portion is set in the open state during a printing operation based on a given print job, controlling the printing unit and the conveying roller so as to resume the printing operation if the first detection sensor detects the closed state before an elapse of the predetermined time period.

* * * * *